(12) United States Patent
Bender

(10) Patent No.: US 7,086,317 B2
(45) Date of Patent: Aug. 8, 2006

(54) METHOD FOR MANUFACTURING LINEAR MOTOR LAMINATION

(75) Inventor: Mark Bender, Algonquin, IL (US)

(73) Assignee: Tempel Steel Company, Chicago, IL (US)

( * ) Notice: Subject to any disclaimer, the term of this patent is extended or adjusted under 35 U.S.C. 154(b) by 166 days.

(21) Appl. No.: 10/627,424

(22) Filed: Jul. 25, 2003

(65) Prior Publication Data

US 2005/0016249 A1    Jan. 27, 2005

(51) Int. Cl.
*B26D 3/00* (2006.01)

(52) U.S. Cl. .................. 83/39; 83/32; 83/550; 83/551

(58) Field of Classification Search .................. 29/596, 29/568, 609; 83/32, 39–50, 549–552, 687, 83/691, 619

See application file for complete search history.

(56) References Cited

U.S. PATENT DOCUMENTS

| | | | | |
|---|---|---|---|---|
| 1,962,431 A | * | 6/1934 | Daley | 83/33 |
| 3,213,727 A | * | 10/1965 | Schwennesen | 83/32 |
| 3,456,535 A | * | 7/1969 | Schwennesen | 83/23 |
| 3,491,437 A | * | 1/1970 | Small | 29/602.1 |
| 3,715,943 A | * | 2/1973 | Hirai et al. | 83/50 |
| 4,728,382 A | * | 3/1988 | Raschbichler | 156/264 |
| 5,333,525 A | * | 8/1994 | Schlegel | 83/23 |
| 5,406,243 A | * | 4/1995 | Jenkins et al. | 336/217 |
| 5,604,971 A | * | 2/1997 | Steiner | 29/596 |
| 5,859,486 A | * | 1/1999 | Nakahara et al. | 310/254 |
| 6,131,268 A | * | 10/2000 | Neuenschwander | 29/596 |
| 6,147,431 A | * | 11/2000 | Asao et al. | 310/254 |

* cited by examiner

*Primary Examiner*—Allan N. Shoap
*Assistant Examiner*—Carolyn T. Blake
(74) *Attorney, Agent, or Firm*—Schiff Hardin LLP

(57) ABSTRACT

For manufacturing a straight strip lamination, a die is provided having at least a main slot punch and a part feature punch. The strip is fed into the die station with a constant slot step distance progression with the slot punch activated to create a plurality of slots. When a part feature is to be punched, the slot punch is deactivated, the part feature punch is activated, and the strip is fed with a new step distance, which is different than the slot distance.

16 Claims, 2 Drawing Sheets

METHOD FOR MANUFACTURING LINEAR MOTOR LAMINATION

BACKGROUND OF THE INVENTION

Linear motor cores are known which are formed of a stack of relatively long longitudinally extending strip laminations. Along one edge, the strip laminations have a plurality of teeth, typically all of a same width. At opposite ends of the lamination strip it is known to provide a termination tooth. Along the strip edge opposite the teeth, it is also known to provide part features, such as, for example "T-slots", which may receive a staking element or connecting element for aligning and connecting a stack of the straight lamination strips together.

In the manufacture of such prior art motor laminations, it was previously known to employ a linear motor die in which each lamination was stamped out in a single hit. Thus the entire strip lamination would be produced with each stroke of the press. Such dies can become very large and costly. Because the entire lamination is stamped out in one stroke, the single hit dies require large presses and generally run at a low speed. Furthermore, handling the parts as they come out of the die can be difficult, and can result in damage to the parts.

It is also known in the manufacture of prior art linear motor laminations to provide a progressive die with multiple stations. In a first station, for example, all the teeth of an entire strip are punched out with each stroke of the press, and in a second station with each stroke of the press additional features of the entire strip are punched out. As is the case with the single hit die described above, since the entire strip is being punched out in each die station, such dies are very large and costly. Also with such prior art progressive dies, large presses are required which run at a low speed. And, as in the case of the single hit die, handling of parts as they exit the die can be difficult, which can result in damage to the parts.

SUMMARY OF THE INVENTION

It is an object of the invention to provide a manufacturing method for straight strip laminations which is flexible, reduces the cost and number of dies required, manufactures a variety of different types of straight strip laminations, and which allows operation on smaller presses which may generally be run at higher speeds. It is also an object to simplify the handling of the straight strip laminations as they exit from the press die.

According to the present invention, a method is provided for manufacturing a straight strip lamination with a die having at least a main slot punch and a part feature punch. A strip is fed into the die station with a constant slot step distance progression and with the slot punch activated to create a plurality of slots. When a part feature is to be punched, the slot punch is deactivated, the part feature punch is activated, and the strip is fed with a part feature step distance which is different than the slot step distance.

DESCRIPTION OF THE PREFERRED EMBODIMENT

Figure 1:
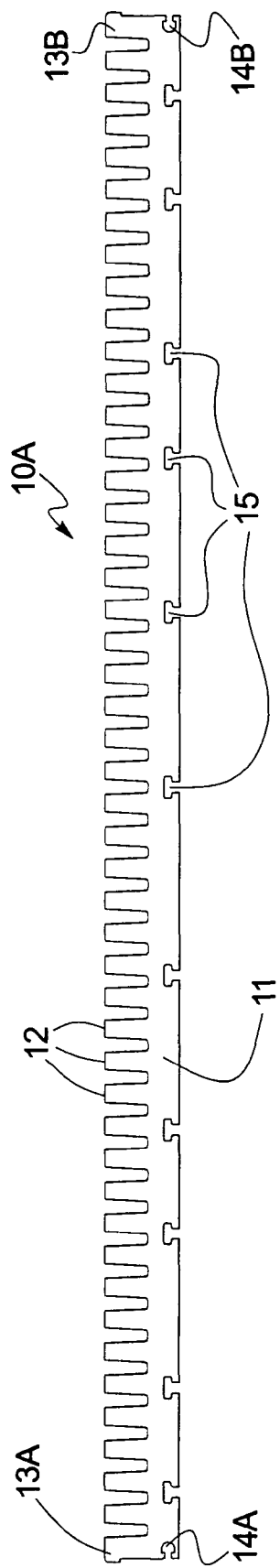
FIG. 1 is a plan view of a single linear motor strip lamination produced by the die shown in FIG. 2.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Figure 2:
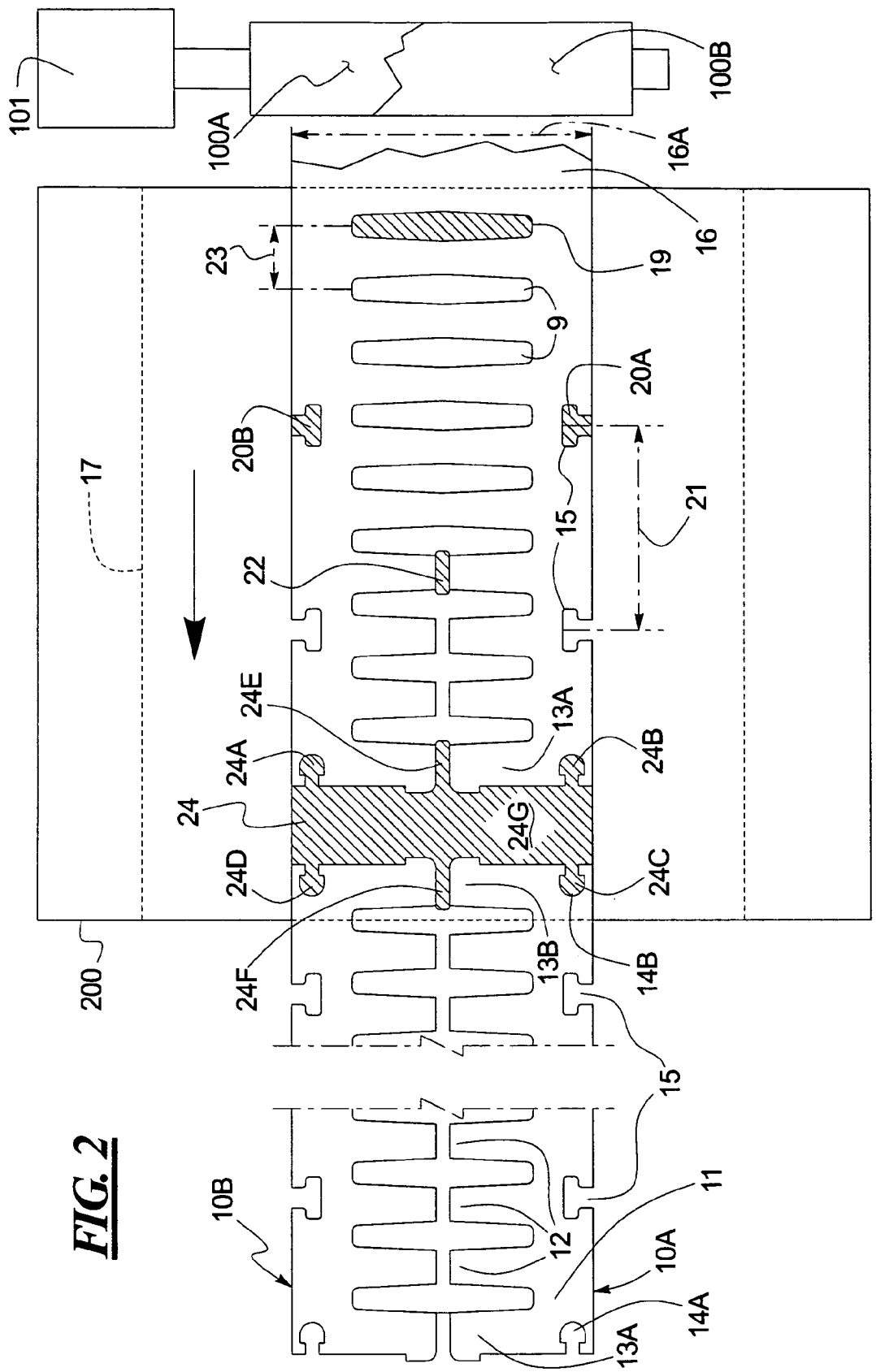
FIG. 2 is a plan view of the linear motor strip lamination resulting from punching a continuous strip fed into a die, and also showing two completed linear motor strip laminations which are facing each other as they exit from the die.

FIG. 1 shows at 10A one of the two completed linear motor strip laminations 10A, B exiting from the die 17 in FIG. 2. The die is mounted in a press 200. The motor lamination 10A comprises a straight longitudinally extending strip 11 having at an upper edge a plurality of equal width teeth 12 at a given constant step distance progression (constant spacing), and two end teeth 13A, 13B which may have a different shape than the intermediate teeth 12.

At an opposite lower edge of the strip 11, a plurality of part features such as T-slots 15 are provided having a different step distance progression and a varying spacing pattern. The part feature, of course, could have many other shapes. T-slots are typically used in linear motor laminations for aligning the laminations and/or for holding the laminations together by elements which pass through the T-slots when the laminations are stacked upon one another.

At the end teeth 13A, 13B additional end slots 14A, 14B are provided having a different shape than the T-slots 15. End slots 14A, 14B can have a variety of shapes. Also, other types of punched-out part features can be provided in the linear motor lamination, depending on the type of linear motor being manufactured. Furthermore, the part feature pattern may also be constant (constant spacing between part features). Moreover, the shape of the teeth, the width of the teeth, the tooth spacing, and other features of the strip may change, depending on the type of linear motor lamination being manufactured.

In the plan view of FIG. 2, a continuous strip 16 enters from the right into a die 17 having a strip servo feed. The strip has a width 16A. The strip is typically formed of an electrical steel well known in the art for forming motor laminations.

Strip servo feeds are known in the prior art. For example, two pinch rollers 100A, 100B are aligned at the entry to the die for feeding the strip 16 pinched therebetween into the die. As is known in the prior art, the pinch rollers are driven by a servo motor 101 which can be electrically controlled to feed the strip with each stroke of the press a given step distance. As is also known in the art, a program control is employed to control the servo motor 101 so that the step distance for each stroke of the press can be set for the particular entire motor lamination strip being punched out. However, as explained hereafter, with the system disclosed herein, the servo motor does not advance the strip a step distance corresponding to the length of the entire linear motor lamination strip, as was the case with the prior art single shot and progressive linear motor lamination die systems.

Rather, with the present disclosed system, the servo motor advances the strip a step distance corresponding to the spacing between each slot if one slot punch is provided, for example. If more than one slot punch is employed, such as 2 or 3, then the advance distance by the servo motor 101 will correspond to the step distance between each slot times the number of slot punches.

Furthermore, as explained hereafter, with the system disclosed herein, the servo motor switches to a new feed step distance for a subsequent stroke of the press corresponding to a part feature to be punched.

As shown in FIG. 2, within the die 17 there are provided a plurality of punches. A main slot punch 19 forms the teeth of two adjacent linear motor laminations to be produced, with the teeth of each motor lamination facing each other when they exit from the die. Although only a single slot punch is shown, it is within the scope of this disclosure to provide more than one slot punch.

The die 17 also has, as part features, T-slot punches 20A and 20B. These punches are only shown as one example of a punch for creating a particular kind of part feature. Many different kinds of part features may be provided, depending on the type of linear motor being manufactured.

The die 17 also includes a separator punch 22 which separates the two laminations and creates separated teeth facing each other. The length of the separator punch, of course, can vary depending on the distance between the slots 9 created by the punch 19. The distance 23 is known as the slot step distance progression.

Although only a single separator punch is shown, it is within the scope of this disclosure to provide more than one separator punch. The distance between the T-slots 15 may be constant (constant part feature step distance progression) or variable (variable progression) part feature step distance. The part feature distance is indicated at 21 and is known as the part feature step distance progression.

At the left side of the die 17 is provided the cut-off end contour punch. This cut-off end contour punch 24 is employed at the beginning and the end of each complete linear motor step lamination and has punch portions 24A, B, C, D for creating the end notches or slots 14A, B, has a central punch portion 24G, and an intermediate punch portion 24 with extensions 24E, 24F functioning as a separator punch portion between the opposite facing end teeth 13A, 13B.

To the left in FIG. 2 are illustrated the two finished linear motor strip laminations 10A, 10B, with their teeth facing each other.

In one modified embodiment, the laminations exiting from the die 17 can be continuous and can be rolled into a coil. Thereafter, when the coil is unwound, the separate motor strip laminations can be cut from the roll. In this case, of course, the cut-off end contour punch is not employed, except at the beginning and end of the long strip forming the lamination coil.

Figure 3:
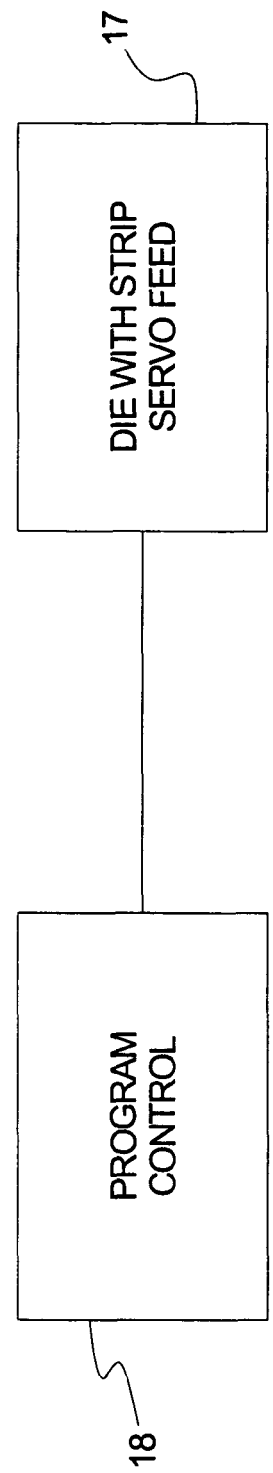
FIG. 3 is a block diagram of the program control connected to the die with a strip servo feed as shown in FIG. 2.

As shown in FIG. 3, a program control 18 controls the die 17 with strip servo feed. The program control 18 activates the main slot punch 19 and controls the servo motor 101 to create the desired slot step distance progression 23. When the T-slots are to be punched, the program control 18 deactivates the slot punch and separator punch 22, activates the feature punch (T-slot punch 28A, 28B), and changes the step distance.

The separator punch 22 is activated when the slot punch 19 is activated to stamp out the region between each slot. When a beginning or end of a desired linear motor lamination is reached, the cut-off end contour punch 24 is activated.

The method of operation of the system will now be described sequentially and in greater detail.

Assuming only a single slot punch is employed, with the slot punch actuated or enabled, the servo motor 101 feeds the strip a given slot step distance, which is the distance between slots. With each stroke of the press, a slot is punched out. Thus, the feeding occurs in constant slot distance steps known as a constant slot step distance progression until such time as a part feature is to be punched. Of course, the separator punch 22 is also activated during activation of the slot punch. It may be appreciated that the step distance progression for the slots is also the same step progression used for the separator punch.

When a part feature is to be punched, the slot and separator punches are deactivated and the part feature punch or punches are activated, such as for the T-slots 20A, 20B. At this time, the servomotor 101 is controlled by the program control 18 to advance the strip a new step distance corresponding to the distance between the middle of the slot and the location of the middle of the part feature to be stamped. This so-called "entry distance" for the example shown in FIG. 2 would be considerably shorter then the distance between the middle of the slots.

After stamping the part feature, the part feature punch is deactivated and the slot and separator punches are reactivated. Also, the servomotor is controlled by the program control 18 to advance the strip a so-called "exit distance" corresponding to the difference between the slot step distance and the entry distance. At this time, the next slot is punched. Thereafter, the servomotor is then controlled with the normal slot step distance progression until the next time that another part feature is to be punched.

Although the part features may be arranged in a given pattern with unequal distance between the part features as shown in FIG. 1, the part features may also have a constant spacing pattern.

Activation of the cut-off end contour punch 24 is programmed to occur at the beginning and end of the linear motor strip lamination. The slot, separator, and part feature punches may be deactivated at this time. The servo motor can then receive a control command from the program control 18 to advance the strip a new step distance corresponding to a desired distance between the center of the cut-off end contour punch and the middle of the last or first slot of the lamination strip.

Thus with the disclosed system and method, the strip moves in a progression of step distances which can be changed at any time to a new step distance corresponding to the part feature or cut-off end contour punch to be activated.

With the disclosed method, the step distance progression for the part features does not have to be evenly divisible by the slot step distance progression.

With the disclosed method, the die press can be small in view of the relatively small areas being punched out in the strip each time the press activates the die.

In the disclosed method, the programmable servo feed varies the length of the progression dependent on the features being punched in a given strip at a given time.

All punches may be cam actuated as is well known to those skilled in the art. The length of the straight linear motor lamination is not limited by coil widths, die, or press size.

The finished product can be cut to a specific length or it can be recoiled and sold in coil form.

Although the production of only two laminations is illustrated in FIG. 2, four laminations could also be produced by repeating the pattern shown in FIG. 2 along a second parallel region.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim:

1. A method for manufacturing a straight strip lamination with a press, comprising the steps of:
   providing in the press a die comprising a main slot punch, a separator punch, and a part feature punch;
   activating the main slot and separator punches and deactivating the part feature punch;
   with each stroke of the press, feeding a strip into the die a first same step distance and repeatedly stamping with the main slot punch and the separator punch to create a plurality of slots with punched-out separations therebetween having a desired constant slot distance progression;
   deactivating the main slot punch and the separator punch and activating the part feature punch, and for the next stroke of the press feeding the strip into the die a second step distance different than said first step distance and stamping with the part feature punch so as to create at least one part feature in said strip; and
   deactivating the part feature punch and reactivating the slot punch and the separator punch and for the next stroke of the press feeding the strip into the die a third step distance equal to a difference between said first and second step distances, and stamping with the slot and separator punches.

2. The method according to claim 1 wherein following said third step distance, feeding the strip with said first same step distance and stamping with the slot and separator punches.

3. The method according to claim 1 including the step of providing a cut-off end contour punch in the die, deactivating the slot and separator punches and activating the cut-off end contour punch, and feeding the strip and stamping with the cut-off end contour punch.

4. The method according to claim 3 wherein the strip is fed prior to stamping with the cut-off end contour punch with a fourth step distance different than at least one of said first, second, and third step distances.

5. The method according to claim 4 wherein the fourth step distance is different than the first, second, and third step distances.

6. The method according to claim 1 including the step of providing said part feature as a T-slot.

7. The method according to claim 1 including the step of feeding the strip with opposed pinch rollers driven by a servo motor controlled by a program control.

8. The method according to claim 1 including the step of coiling a completed strip at an output of the die.

9. The method according to claim 1 including the step of producing linear motor straight strip laminations.

10. The method according to claim 1 including the step of providing the slot punch so that teeth are formed in two parallel strips.

11. The method according to claim 1 including the step of providing the die beginning at strip entrance end with the slot punch, followed by the part feature punch, which is then followed by the separator punch.

12. The method according to claim 11 including the step of following the separator punch by a cut-off end contour punch.

13. The method according to claim 12 wherein the cut-off end contour punch has a separator punch portion.

14. The method according to claim 12 wherein the cut-off end contour punch has a part feature portion.

15. The method according to claim 1 wherein the die outputs a continuous strip of completed lamination which is coiled, and then later the coil is uncoiled and separate strip laminations are punched from the continuous coil lamination.

16. A method for manufacturing a straight strip lamination with a press, comprising the steps of:
   providing in the press a die comprising a main slot punch and a part feature punch;
   activating the main slot punch and deactivating the part feature punch;
   with each stroke of the press, feeding a strip into the die a first same step distance and repeatedly stamping with the main slot punch to create a plurality of slots having a desired constant slot distance progression;
   deactivating the main slot punch and activating the part feature punch, and for the next stroke of the press feeding the strip into the die a second step distance different than said first step distance and stamping with the part feature punch so as to create at least one part feature in said strip; and
   deactivating the part feature punch and reactivating the slot punch and for the next stroke of the press feeding the strip into the die a third step distance equal to a difference between first and second step distances, and stamping with the slot punch.

* * * * *